(12) United States Patent
Lei

(10) Patent No.: US 9,160,395 B2
(45) Date of Patent: Oct. 13, 2015

(54) METHOD AND TERMINAL DEVICE FOR AUTOMATICALLY TUNING IMPEDANCE MATCHING OF MULTI-FREQUENCY BAND ANTENNA

(75) Inventor: Gang Lei, Beijing (CN)

(73) Assignee: ST-ERICSSON SEMICONDUCTOR (BEIJING) CO., LTD, Beijing (CN)

( * ) Notice: Subject to any disclaimer, the term of this patent is extended or adjusted under 35 U.S.C. 154(b) by 128 days.

(21) Appl. No.: 13/977,048

(22) PCT Filed: Dec. 30, 2011

(86) PCT No.: PCT/CN2011/085068
§ 371 (c)(1),
(2), (4) Date: Dec. 11, 2013

(87) PCT Pub. No.: WO2012/092829
PCT Pub. Date: Jul. 12, 2012

(65) Prior Publication Data
US 2014/0323065 A1    Oct. 30, 2014

(30) Foreign Application Priority Data
Jan. 4, 2011   (CN) .......................... 2011 1 0005311

(51) Int. Cl.
*H04B 1/40* (2015.01)
*H01Q 1/24* (2006.01)
*H01Q 5/00* (2015.01)
*H04W 52/02* (2009.01)

(52) U.S. Cl.
CPC ................ *H04B 1/40* (2013.01); *H01Q 1/243* (2013.01); *H01Q 5/00* (2013.01); *H04W 52/0251* (2013.01)

(58) Field of Classification Search
CPC ...................................... H04B 1/0458
USPC ............. 455/77, 80, 90.3, 129, 562.1, 575.7
See application file for complete search history.

(56) References Cited

U.S. PATENT DOCUMENTS 7,454,227 B2 * 11/2008 Kitaji ............................ 455/522
7,834,813 B2 * 11/2010 Caimi et al. ................... 343/745
(Continued)

FOREIGN PATENT DOCUMENTS

| CN | 101496222 A | 7/2009 |
| CN | 201388196 Y | 1/2010 |

(Continued)

OTHER PUBLICATIONS

International Search Report (mailed Apr. 5, 2012, 2 pages) in re: International application No. PCT/CN2011/085068.

*Primary Examiner* — Tuan H Nguyen
(74) *Attorney, Agent, or Firm* — Coats & Bennett, PLLC

(57) ABSTRACT

This invention provides a method and a terminal device for a multi-band antenna automatically tuning impedance matching, and belongs to the technical field of communication. The method includes: obtaining an operation current value and an output power value of a power amplifier upon transmitting a signal; obtaining a logical control parameter for controlling an antenna tuner based on the operation current value and the output power value, and adjusting the impedance matching of the antenna by using the logical control parameter. The efficiency for impedance matching of the antenna upon operating in the multi-bands may be improved, and the power saving can be better implemented under the condition of assuring the performance of the antenna.

20 Claims, 3 Drawing Sheets

(56) References Cited

U.S. PATENT DOCUMENTS

2006/0281423 A1 12/2006 Caimi et al.
2008/0207256 A1 8/2008 Chan

FOREIGN PATENT DOCUMENTS

| | | |
|---|---|---|
| CN | 102143100 A | 8/2011 |
| KR | 20070081866 A | 8/2007 |

* cited by examiner

METHOD AND TERMINAL DEVICE FOR AUTOMATICALLY TUNING IMPEDANCE MATCHING OF MULTI-FREQUENCY BAND ANTENNA

BACKGROUND OF THE INVENTION

1. Technical Field

This invention relates to a communication field, and more particularly to a method and a terminal device for a multi-band antenna automatically tuning impedance matching.

2. Description of the Prior Art

Currently, more and more bands are applied in a terminal device, while the space of the terminal device is limited, which results in that a plurality of bands have to be applied in one primary antenna. The primary antenna has to sacrifice a part of its performance to cover a broader bandwidth and a plurality of bands.

The terminal device only employs the same antenna to cover a plurality of bands while only employing a same set of matching devices, which is prone to generate a mismatching of the antenna in some bands. Furthermore, changes in the surrounding environment are also very prone to give rise to the mismatching of the antenna. Such mismatching may cause a series of problems, such as excessive power consumption and reduced antenna sensitivity, which may affect standby time and continuous call signal quality of the terminal device.

Therefore, a tuner mechanism for adjusting impedance matching of antenna according to operation environment may be required. With such tuner mechanism, the performance of the prior antenna operating at different frequencies may be maximized, and thus the effect of power saving and maintaining the call quality may be achieved.

However, the prior tuner mechanism for the impedance matching of the antenna cannot meet such requirement.

SUMMARY

For solving the above problems, an object of the present invention lies in providing a method and a terminal device for a multi-band antenna automatically tuning impedance matching, which may improve the efficiency for impedance matching of the antenna upon operating in the multi-bands, and better implementing the power saving under the condition of maintaining the performance of the antenna.

For achieving the above object, the present invention provides a method for a multi-band antenna automatically tuning impedance matching, comprising:

obtaining an operation current value and an output power value of a power amplifier upon transmitting a signal;

obtaining a logical control parameter for controlling an antenna tuner based on the operation current value and the output power value, and adjusting the impedance matching of the antenna by using the logical control parameter.

In some embodiments, the step of obtaining the control signal for controlling the antenna tuner and adjusting the impedance matching of the antenna by using the logical control parameter may specifically comprise:

changing the logical control parameter of the antenna tuner, and recording the operation current values of the power amplifier during the adjustment, under a condition that a currently desired output power of the power amplifier is maintained;

selecting the logical control parameter of the antenna tuner that corresponds to the smallest one of the operation current values;

controlling the antenna tuner to change the capacitance in series-parallel therein based on the selected logical control parameter, so as to adjust the impedance matching of the antenna.

In some embodiments, the method may further comprise:
detecting the operation current value and the output power value of the power amplifier.

In some embodiments, the method may further comprise:
setting in advance a period for cyclically detecting the operation current value and the output power value.

In some embodiments, upon receiving the signal, the method may further comprise:

detecting a receiving power value for the received signal;
controlling the antenna tuner to switch within a tunable range, and recording the receiving power values for the received signal during the adjustment;

selecting the logical control parameter of the antenna tuner that corresponds to the largest one of the receiving powers;

controlling the antenna tuner to change the capacitance in series-parallel therein based on the selected logical control parameter, so as to adjust the impedance matching of the antenna.

Similarly, for achieving the above object, the present invention may also provide a terminal device, comprising:

a transceiver, being configured for receiving and transmitting a signal;

a power amplifier, being coupled with the transceiver, and configured for amplifying a power for transmitting the signal;

a current detector, being coupled with the power amplifier, and configured for obtaining an operation current value of current consumed by the power amplifier in operation;

a power coupler, being coupled with the power amplifier, and configured for obtaining an output power value of an output of the power amplifier;

a digital baseband processor, being coupled with the current detector, and configured for obtaining a logical control parameter for controlling an antenna tuner based on the operation current value and the output power value;

the antenna tuner, being coupled with the digital baseband processor, and configured for adjusting an impedance matching of the antenna by using the logical control parameter.

In some embodiments, the digital baseband processor may be further configured for: controlling the antenna tuner to switch within a tunable range, recording a receiving power values for the received signal during the adjustment; and selecting a logical control parameter that corresponds to the largest one of receiving powers to control the antenna tuner to change the capacitance in series-parallel therein, so as to adjust the impedance matching of the antenna.

Furthermore, the terminal device may further comprise:
an analog baseband processor, being coupled with the digital baseband processor and the transceiver respectively, and configured for processing an analog signal.

In some embodiments, the terminal device may further comprise:

an antenna switching module, being coupled with the power coupler and the antenna tuner respectively, and configured for switching a signal on a different path into the antenna.

In some embodiments, the terminal device may further comprise:

a low noise amplifier, being coupled with the transceiver and the antenna switching module respectively, and configured for reducing the noise disturbance in the received signal.

It can be seen from the above technical solutions that the embodiments of the present invention have the following beneficial effects: firstly obtaining the operation current value and the output power value of the power amplifier upon transmitting the signal; then obtaining the logical control parameter for controlling the antenna tuner based on the operation current value and the output power value, and adjusting the impedance matching of the antenna by using the logical control parameter. Therefore the performance of the prior antenna that operates at different frequencies can be improved, and thus the effect of power saving and maintaining the call quality can be achieved.

DETAILED DESCRIPTION

In the present embodiment, a logical control parameter for controlling the antenna tuner may be obtained based on an operating current value and an output power value of a power amplifier upon transmitting a signal. With such a logical control parameter, an impedance matching of the antenna may be adjusted, so that the antenna tuner may maximize the performance of the antenna within an operational range. And thus the performance and the power consumption of the whole terminal device can be optimized.

In the following, the embodiments of the present invention are further explained in details in association with the embodiments and figures to further clarify the objects, technical solutions and advantages of the embodiments of the present invention. Herein, the exemplary embodiments and explanations are used to explain the present invention, but not used to limit the present invention.

Figure 1:
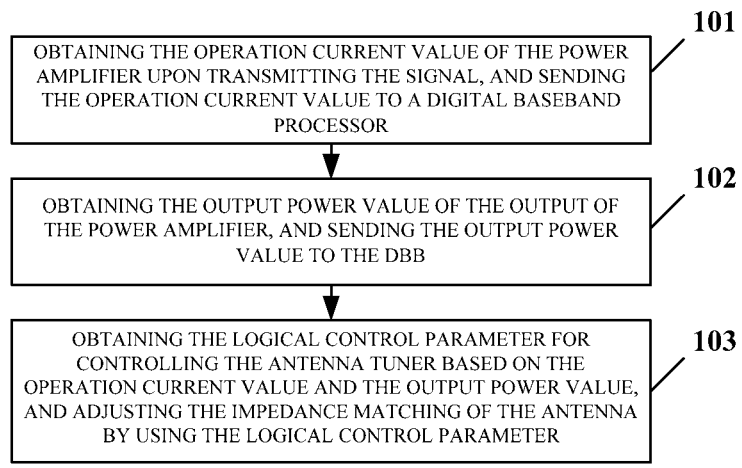
FIG. 1 is a flow chart illustrating the method for the multi-band antenna automatically tuning impedance matching according to an embodiment of the present invention.

FIG. 1 shows a flow chart illustrating the method for the multi-band antenna automatically tuning impedance matching according to an embodiment of the present invention. The specific steps may be as follows:

Step 101: obtaining the operation current value of the power amplifier upon transmitting the signal, and sending the operation current value to a digital baseband processor;

In other words, a current detector may be provided at the power supply side of the power amplifier, while the current detector may detect the operation current value of the current consumed by the power amplifier upon transmitting the signal by means of constant detection, and send the operation current value to the digital baseband processor (DBB) to record the operation current values of the current consumed in different states.

Step 102: obtaining the output power value of the output of the power amplifier, and sending the output power value to the DBB;

In other words, a power coupler may be provided at the output of the power amplifier, while the power coupler may detect the output power value of the output of the power amplifier by means of constant detection, and send the output power value to the DBB to record the output power values in different states.

Step 103: obtaining the logical control parameter for controlling the antenna tuner based on the operation current value and the output power value, and adjusting the impedance matching of the antenna by using the logical control parameter.

The impedance matching may mean the particular coordination relationship between the load impedance and the signal source internal impedance during the transmission of the signal. Some relationship should be met between the output impedance of an equipment and the connected load impedance to avoid the generation of significant affection on the operation state of the equipment itself upon the connection of the load.

In the above steps, under the condition that the currently desired output power of the power amplifier is maintained, the logical control parameter of the antenna tuner may be changed, and the operation current values of the power amplifier during the adjustment may be recorded accordingly; then the logical control parameter of the antenna tuner that corresponds to the smallest one of the operation current values may be selected; finally, based on the selected logical control parameter, the antenna tuner may be controlled to change the capacitance in series-parallel therein, so that the impedance matching of the antenna may be adjusted.

In other words, when the power amplifier outputs a certain power, the output power may remain unchanged. The DBB may control the antenna tuner to switch to each of the frequencies within the tunable range, record the operation current values of the power amplifier during the adjustment, select the logical control parameter of the antenna tuner that corresponds to the smallest one of the operation current, and control the value of the capacitance in series-parallel of the antenna tuner based on the selected logical control parameter.

An exemplary implementation may be as follows: in respect of hardware, a current detector may be provided at the input power supply of the power amplifier (PA), to detect the value (operation current value) of the current consumed by the power amplifier in operation by means of constant detection, and output thus obtained result to the DBB; and in respect of hardware, a power coupler may be provided at the power output of the power amplifier, to detect the power (output power value) for the transmitted signal by the power amplifier in operation by means of constant detection, and output thus obtained result to the DBB. Based on the current value and the output power value, and under the condition that the currently desired output power is maintained, the DBB may change the logical control parameter (logical control voltage) of the antenna tuner, record the operation current values of the power amplifier during the adjustment, select the logical control parameter of the antenna tuner that corresponds to the smallest one of the operation current values; and based on the selected logical control parameter, control the antenna tuner to change the capacitance in series-parallel therein, and thus adjust the impedance matching of the antenna. Therefore, the following object can be achieved: the smallest current is consumed under the condition that the currently desired output power is maintained.

When the transceiver is in operation, the power value for the received signal may be constantly detected, and the status of being connected is maintained. The DBB may control the antenna tuner to switch to each of the frequencies within the tunable range, record the power values for receiving the signal during the adjustment, select the logical control parameter that corresponds to the largest one of the receiving powers, and control the antenna tuner to change the capacitance in series-parallel therein based on the selected logical control parameter, and thus adjust the impedance matching of the antenna.

The logical control parameter of the antenna tuner may only change the value of the capacitance in series-parallel within a certain range. For example, the capacitance in series may be changed from 1 pF to 10 pF, whereas the capacitance in parallel may be changed from 1 pF to 10 pF.

In the present embodiment, a cycle detection period may be set based on the traffic during the operation of the platform, so that the impedance matching can be optimally implemented in time and the effective transmission of the traffic data can be maintained in case that the environment around the antenna changes.

For example, when the receiving mode is set to the coding mode MCS16 according to the current operation environment, its coding redundancy is relatively high, and the requirement for the network environment is relatively low, and the automatic cycle detecting period may be set to T1. And when the platform operates at coding mode MCS20, its coding redundancy is relatively low, and the requirement for the network environment is relatively high, and the automatic cycle detecting period may be set to T2, where T1>T2.

According to the embodiment of the present invention, the parameter of the antenna tuner may be respectively adjusted in respect of both transmitting and receiving, so that the performance of the antenna can be improved.

In referring to the instances and figures, and using a TD-LTE terminal device having operation bands of Band38 and Band40 as an example, the following sections explain how the performance of the antenna will be improved in respect of both transmitting and receiving according to the embodiments of the present invention.

When the surrounding environment regarding the operation of the terminal device changes, the receiving performance of the antenna also changes. Therefore it may be necessary to set proper operation period based on the amount of data during the operation, so that the matching of the terminal may be timely adjusted based on the change of the environment.

For example, when the terminal device startups, it may operate at Band38, and the transceiver may start to operate. During an operation slot, the receiving antenna port may receive the signal from a base station, detect the level value thereof and send the detected level value to the DBB. Then during an idle slot, the antenna tuner may be controlled to change for the impedance matching. And during a next operation slot, the level value may be detected again. Such operation may be repeated, and over and over again, until each of all the impedance matching being controllable by the antenna tuner is tested once, and the power value for receiving the signal each time may be recorded. The impedance matching that corresponds to the largest one of the powers for the received signal may be selected, and the corresponding logical control parameter of the antenna tuner at this time may be locked. Then such matching value may be adopted each time receiving at this frequency during this period, until the next period starts off. Such matching process may be repeated. When the operation frequency of the terminal device changes to Band40, no particular period cycle is required, and the process for determining the optimal impedance matching value of the antenna may be directly executed.

Figure 2:
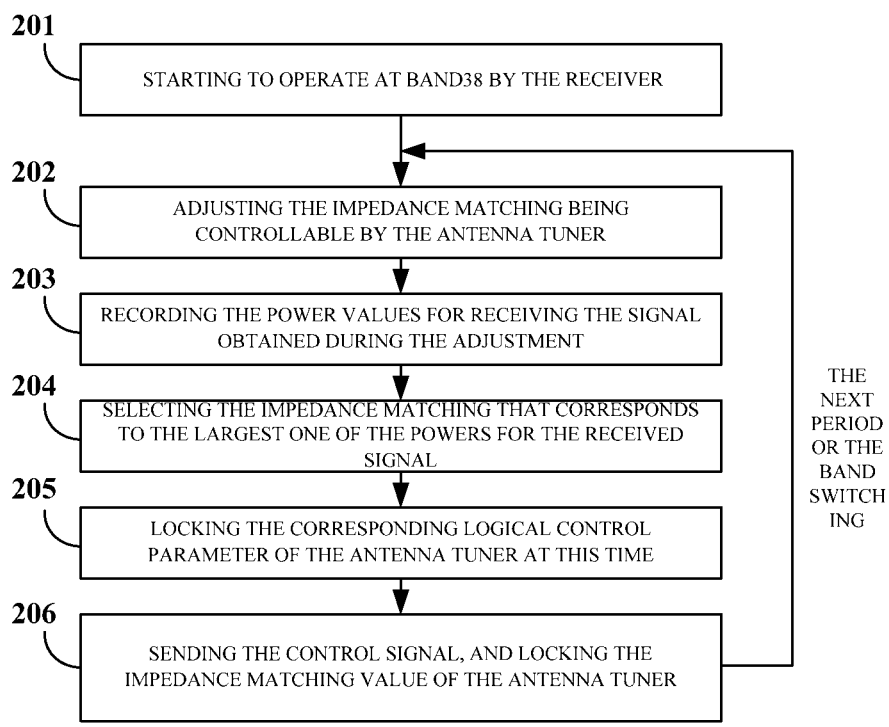
FIG. 2 is a flow chart illustrating a receiving cycle of an antenna tuner at Band38 according to an embodiment of the present invention.

Referring to FIG. 2, it is a flow chart illustrating the receiving cycle of the antenna tuner at Band38 according to an embodiment of the present invention, and the specific steps may be as follows:

Step 201: starting to operate at Band38 by the receiver;
Step 202: adjusting the impedance matching being controllable by the antenna tuner;
Step 203: recording the power values for the received signal obtained during the adjustment;
Step 204: selecting the impedance matching that corresponds to the largest one of the powers for the received signal
Step 205: locking the corresponding logical control parameter of the antenna tuner at this time;
Step 206: sending the control signal, and locking the impedance matching value of the antenna tuner.

After the execution of the step 206, at the next period or after the band switching, it may return to step 201.

Similarly, when the surrounding environment regarding the operation of the terminal device changes, the transmitting performance of the antenna changes as well, and therefore it may be necessary to set proper operation period based on the amount of data during the operation, so that the matching of the terminal may be timely adjusted based on the change of the environment.

For example, when the terminal device startups, it may operate at Band38, and the power amplifier (PA) may start to operate during the operation slot. The power coupler may constantly detect the power output by the power amplifier, and implement a closed-loop control, so that the transceiver may adjust the output power to meet the output power currently required by the system. The current value that corresponds to the operation state at this time may be recorded and sent to the DBB. Then during an idle slot, the antenna tuner may be controlled to change for the impedance matching. And during a next operation slot, the current may be detected again. Such operation may be repeated, and over and over again, until each of all the impedance matching being controllable by the antenna tuner is tested once, and the power values for transmitting the level each time may be recorded. The impedance matching that corresponds to the smallest one of the current values for transmitting the level may be selected, and the corresponding logical control voltage of the antenna tuner at this time may be locked. Then such matching impedance value may be adopted each time transmitting at this frequency during this period, until the next period starts off Such matching process may be repeated. When the operation frequency of the terminal device changes to Band40, no particular period cycle is required, and the process for determining the optimal matching value of the antenna may be directly executed.

Figure 3:
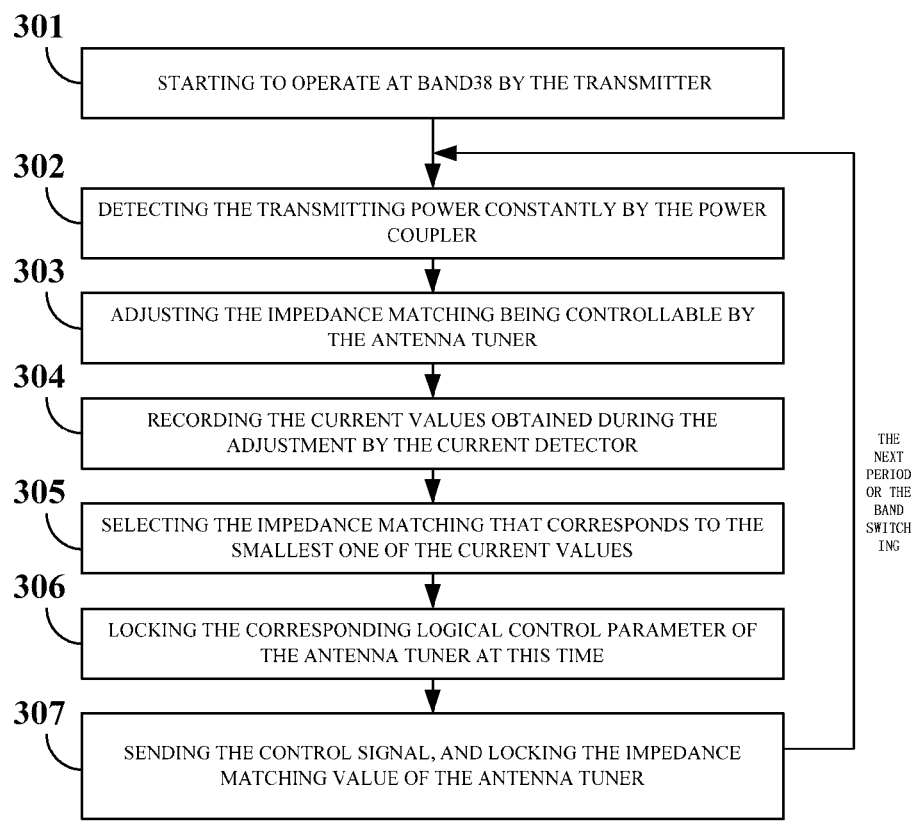
FIG. 3 is a flow chart illustrating a transmitting cycle of an antenna tuner at Band38 according to an embodiment of the present invention.

Referring to FIG. 3, it is a flow chart illustrating the transmitting cycle of the antenna tuner at Band38 according to an embodiment of the present invention, and the specific steps may be as follows:

Step 301: starting to operate at Band38 by the transmitter;
Step 302: detecting the output power constantly by the power coupler;
Step 303: adjusting the impedance matching being controllable by the antenna tuner;
Step 304: recording the current values obtained during the adjustment by the current detector;
Step 305: selecting the impedance matching that corresponds to the smallest one of the current values;
Step 306: locking the corresponding logical control parameter of the antenna tuner at this time;
Step 307: sending the control signal, and locking the impedance matching value of the antenna tuner.

After the execution of the step 307, at the next period or after the band switching, it may return to step 301.

According to the above technical solution, the embodiments of the present invention have many beneficial effects.

For example, by firstly obtaining the operation current value and the output power value of the power amplifier, then obtaining the logical control parameter for controlling the antenna tuner based on the operation current value and the output power value, and adjusting the impedance matching of the antenna by using the logical control parameter, the performance of the prior antenna operating at different frequencies can be improved, and thus the effect of power saving and maintaining the call quality can be achieved.

Figure 4:
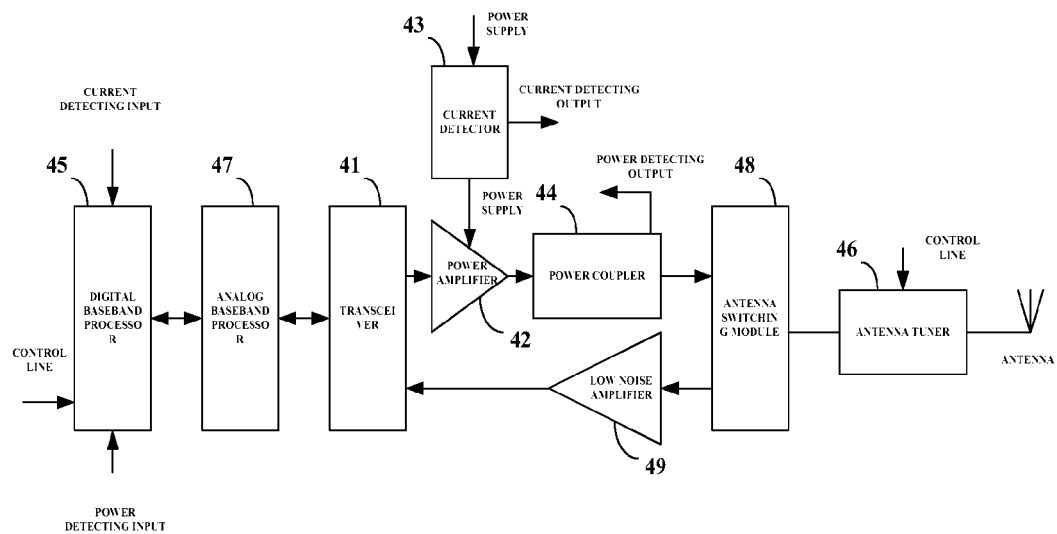
FIG. 4 is a structure block diagram of a terminal device according to an embodiment of the present invention.

Referring to FIG. 4, it is a structure block diagram of the terminal device according to the embodiment of the present invention. The terminal device may comprise:

a transceiver 41, being configured for receiving and transmitting the signal;

a power amplifier 42, being coupled with the transceiver 41, and configured for amplifying the power for transmitting the signal;

a current detector 43, being coupled with the power amplifier 42, and configured for obtaining the operation current value of the current consumed by the power amplifier 42 in operation;

a power coupler 44, being coupled with the power amplifier 42, and configured for obtaining the output power value of the output of the power amplifier;

a digital baseband processor 45, being coupled with the current detector 43, and configured for obtaining the logical control parameter for controlling the antenna tuner based on the operation current value and the output power value;

the antenna tuner 46, being coupled with the digital baseband processor 45, and configured for adjusting the impedance matching of the antenna by using the logical control parameter.

According to another embodiment of the present invention, the digital baseband processor 45 may be further configured for: controlling the antenna tuner to switch within the tunable range, recording the receiving power values for the received signal during the adjustment, selecting the logical control parameter that corresponds to the largest one of receiving powers, to control the antenna tuner to change the capacitance in series-parallel therein, so as to adjust the impedance matching of the antenna.

According to another embodiment of the present invention, the terminal device may further comprise an analog baseband processor 47, being coupled with the digital baseband processor 45 and the transceiver 41 respectively, and configured for processing an analog signal.

According to another embodiment of the present invention, the terminal device may further comprise an antenna switching module 48, being coupled with the power coupler 44 and the antenna tuner 46 respectively, and configured for switching a signal on a different path into the antenna.

According to another embodiment of the present invention, the terminal device may further comprise a low noise amplifier 49, being coupled with the transceiver 41 and the antenna switching module 48 respectively, and configured for reducing the noise disturbance in the received signal.

Figure 5:
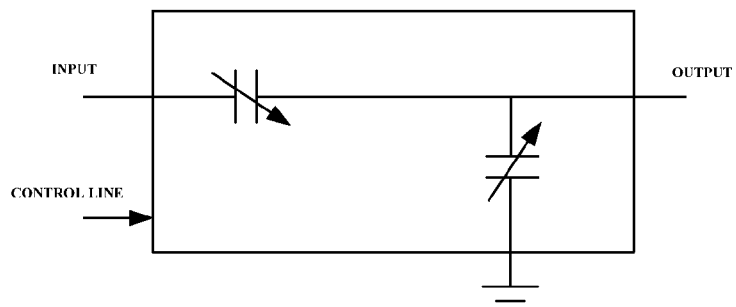
FIG. 5 is a schematic diagram of the antenna tuner illustrated in FIG. 4 according to an embodiment of the present invention.

Referring to FIG. 5, it is a schematic diagram of the antenna tuner illustrated in FIG. 4 according to an embodiment of the present invention. The antenna tuner is used for logically switching in the device to change the capacitance in series-parallel by the logical control voltage outputted by the DBB. In other words, the antenna tuner refers to a device for changing the impedance matching of a radio frequency circuit by the control signal of the DBB.

The above descriptions are only exemplary embodiments of the present invention. It should be noted that, for those ordinary skilled in the art, many modifications and adjustments may be made without departure from the principles of the present invention, and these modification and adjustments should also fall into the protection scope of the present invention.

What is claimed is:

1. A method for a multi-band antenna automatically tuning impedance matching, comprising:
   obtaining an operation current value of a power amplifier and an output power value of the power amplifier upon transmitting a signal;
   obtaining a logical control parameter for controlling an antenna tuner based on the operation current value and the output power value; and
   adjusting the impedance matching of the antenna by using the logical control parameter.

2. The method according to claim 1, wherein the step of obtaining the logical control parameter for controlling the antenna tuner and adjusting the impedance matching of the antenna by using the logical control parameter specifically comprises:
   changing the logical control parameter of the antenna tuner, and recording the operation current values of the power amplifier during the adjustment, under a condition that a currently desired output power of the power amplifier is maintained;
   selecting the logical control parameter of the antenna tuner that corresponds to the smallest one of the operation current values; and
   controlling the antenna tuner to change the capacitance in series-parallel therein based on the selected logical control parameter, so as to adjust the impedance matching of the antenna.

3. The method according to claim 1, wherein the method further comprises:
   detecting the operation current value and the output power value of the power amplifier.

4. The method according to claim 3, wherein the method further comprises:
   setting in advance a period for cyclically detecting the operation current value and the output power value.

5. The method according to claim 1, wherein upon receiving the signal, the method further comprises:
   detecting a receiving power value for the received signal;
   controlling the antenna tuner to switch within a tunable range, and recording the receiving power values for the received signal during the adjustment;
   selecting the logical control parameter of the antenna tuner that corresponds to the largest one of the receiving powers; and
   controlling the antenna tuner to change the capacitance in series-parallel therein based on the selected logical control parameter, so as to adjust the impedance matching of the antenna.

6. The method of claim 1, wherein obtaining the logical control parameter includes:
   changing the logical control parameter of the antenna tuner, and recording the operation current values of the power amplifier during the adjustment, under a condition that a currently desired output power of the power amplifier is maintained; and
   selecting the logical control parameter of the antenna tuner that corresponds to the smallest one of the operation current values.

7. The method of claim 1, wherein adjusting the impedance matching of the antenna includes:

controlling the antenna tuner to change the capacitance in series-parallel therein based on the selected logical control parameter.

8. The method of claim 1, further comprising:
during a first operation slot of a receiver, detecting a power value of a first received signal;
during a second operation slot of the receiver:
  controlling the antenna tuner to switch within a tunable range; and
  detecting a power value of a second received signal, wherein the first and second received signals are received by the receiver from the antenna;
selecting the logical control parameter of the antenna tuner that corresponds to the largest one of the power values of the first and second received signals; and
controlling the antenna tuner to adjust the impedance matching of the antenna during a third operation slot of the receiver based on the selected logical control parameter.

9. A terminal device, comprising:
a transceiver, being configured for receiving and transmitting a signal;
a power amplifier, being coupled with the transceiver, and configured for amplifying a power for transmitting the signal;
a current detector, being coupled with the power amplifier, and configured for obtaining an operation current value of current consumed by the power amplifier in operation;
a power coupler, being coupled with the power amplifier, and configured for obtaining an output power value of an output of the power amplifier;
a digital baseband processor, being coupled with the current detector, and configured for obtaining a logical control parameter for controlling an antenna tuner based on the operation current value of the power amplifier and the output power value of the power amplifier; and
the antenna tuner, being coupled with the digital baseband processor, and configured for adjusting an impedance matching of the antenna by using the logical control parameter.

10. The terminal device according to claim 9, wherein the digital baseband processor is further configured for: controlling the antenna tuner to switch within a tunable range, recording a receiving power values for the received signal during the adjustment; and selecting a logical control parameter that corresponds to the largest one of receiving powers to control the antenna tuner to change the capacitance in series-parallel therein, so as to adjust the impedance matching of the antenna.

11. The terminal device according to claim 10, wherein the terminal device further comprises:
an analog baseband processor, being coupled with the digital baseband processor and the transceiver respectively, and configured for processing an analog signal.

12. The terminal device according to claim 11, wherein the terminal device further comprises:
an antenna switching module, being coupled with the power coupler and the antenna tuner respectively, and configured for switching a signal on a different path into the antenna.

13. The terminal device according to claim 12, wherein the terminal device further comprises:
a low noise amplifier, being coupled with the transceiver and the antenna switching module respectively, and configured for reducing the noise disturbance in the received signal.

14. The terminal device of claim 6, wherein obtaining the logical control parameter includes the digital baseband processor being further configured to:
change the logical control parameter of the antenna tuner, and recording the operation current values of the power amplifier during the adjustment, under a condition that a currently desired output power of the power amplifier is maintained; and
select the logical control parameter of the antenna tuner that corresponds to the smallest one of the operation current values.

15. The terminal device of claim 6, wherein adjusting the impedance matching of the antenna includes the digital baseband processor being further configured to:
control the antenna tuner to change the capacitance in series-parallel therein based on the selected logical control parameter.

16. The terminal device of claim 6, further comprising:
a low noise amplifier operationally coupled between the transceiver and the antenna tuner; and
wherein the digital baseband processor is further configured to:
  during a first operation slot of a receiver, detect a power value of a first received signal;
  during a second operation slot of the receiver:
    control the antenna tuner to switch within a tunable range; and
    detect a power value of a second received signal, wherein the first and second received signals are received by the receiver from the antenna;
  select the logical control parameter of the antenna tuner that corresponds to the largest one of the power values of the first and second received signals; and
  control the antenna tuner to adjust the impedance matching of the antenna during a third operation slot of the receiver based on the selected logical control parameter.

17. A non-transitory computer-readable medium encoded with a computer program, the computer program comprising computer-executable instructions that when executed by a processor causes the processor to perform operations, wherein the operations are configured to:
obtain an operation current value of a power amplifier and an output power value of the power amplifier upon transmitting a signal;
determine a logical control parameter for controlling an antenna tuner based on the operation current value of the power amplifier and the output power value of the power amplifier; and
output, to an antenna tuner, the logical control parameter to adjust the impedance matching of an antenna.

18. The computer-readable medium of claim 17, wherein obtaining the logical control parameter includes the operations being further configured to:
change the logical control parameter of the antenna tuner, and record the operation current values of the power amplifier during the adjustment, under a condition that a currently desired output power of the power amplifier is maintained; and
select the logical control parameter of the antenna tuner that corresponds to the smallest one of the operation current values.

19. The computer-readable medium of claim 17, wherein adjusting the impedance matching of the antenna includes the operations being further configured to:

control the antenna tuner to change the capacitance in series-parallel therein based on the selected logical control parameter.

20. The computer-readable medium of claim 17, wherein the operations are further configured to:
during a first operation slot of a receiver, detect a power value of a first received signal;
during a second operation slot of the receiver:
control the antenna tuner to switch within a tunable range; and
detect a power value of a second received signal, wherein the first and second received signals are received by the receiver from the antenna;
select the logical control parameter of the antenna tuner that corresponds to the largest one of the power values of the first and second received signals; and
control the antenna tuner to adjust the impedance matching of the antenna during a third operation slot of the receiver based on the selected logical control parameter.

* * * * *